US012684263B2

(12) United States Patent　(10) Patent No.: US 12,684,263 B2
Gui et al.　(45) Date of Patent: Jul. 14, 2026

(54) IMAGING DEVICE AND ELECTRONIC APPARATUS

(71) Applicant: SONY SEMICONDUCTOR SOLUTIONS CORPORATION, Kanagawa (JP)

(72) Inventors: Gui Gui, Rochester, NY (US); Hirotaka Murakami, San Jose, CA (US); Hung Doan, Rochester, NY (US); Sungin Han, New York, NY (US); Frederick Brady, Rochester, NY (US)

(73) Assignee: Sony Semiconductor Solutions Corporation, Kanagawa (JP)

( * ) Notice: Subject to any disclaimer, the term of this patent is extended or adjusted under 35 U.S.C. 154(b) by 184 days.

(21) Appl. No.: 18/366,893

(22) Filed: Aug. 8, 2023

(65) Prior Publication Data

US 2024/0056699 A1　Feb. 15, 2024

Related U.S. Application Data

(60) Provisional application No. 63/396,508, filed on Aug. 9, 2022.

(51) Int. Cl.
　　H04N 25/77　　(2023.01)
　　H04N 25/46　　(2023.01)
(52) U.S. Cl.
　　CPC ............. H04N 25/77 (2023.01); H04N 25/46 (2023.01)

(58) Field of Classification Search
None
See application file for complete search history.

(56) References Cited

U.S. PATENT DOCUMENTS

| | | | |
|---|---|---|---|
| 2006/0274176 A1* | 12/2006 | Guidash | H04N 25/46 348/E3.02 |
| 2010/0182465 A1* | 7/2010 | Okita | H04N 25/778 348/300 |
| 2015/0181142 A1 | 6/2015 | Lin et al. | |
| 2016/0141326 A1 | 5/2016 | Hanzawa et al. | |
| 2018/0070036 A1 | 3/2018 | Centen et al. | |
| 2021/0112214 A1* | 4/2021 | Machida | H04N 25/57 |
| 2022/0174232 A1* | 6/2022 | Kim | H04N 25/46 |

FOREIGN PATENT DOCUMENTS

| | | |
|---|---|---|
| JP | 2015-177429 | 10/2015 |
| JP | 2019-530321 | 10/2019 |
| WO | WO 2018/046688 | 3/2018 |

* cited by examiner

*Primary Examiner* — Mark T Monk
(74) *Attorney, Agent, or Firm* — SHERIDAN ROSS P.C.

(57)　　ABSTRACT

Color image sensors and systems are provided. A color image sensor as disclosed includes a plurality of pixels disposed within an array, each of which includes a plurality of sub-pixels. A pixel array includes pixel cells, each pixel cell including one or more photodiodes. Pixel cells are arranged in rows and columns. The pixel array includes transistors for vertical binning of pixel cells in different rows and transistors for horizontal binning of pixel cells in different columns.

20 Claims, 16 Drawing Sheets

SEL1

SEL2

RST

TRG

IMAGING DEVICE AND ELECTRONIC APPARATUS

CROSS REFERENCE TO RELATED APPLICATIONS

This application claims the benefit of U.S. Provisional Application No. 63/396,508 filed Aug. 9, 2022, the entire disclosure of which is incorporated herein by reference.

FIELD

The present disclosure relates generally to imaging devices and more particularly to a pixel array enabling horizontal and vertical binning of pixel signals.

BACKGROUND

Digital image sensors are commonly used in a variety of electronic devices, such as handheld cameras, security systems, telephones, computers, and tablets, to capture images. Image sensing devices, such as cameras, typically include an image sensor—generally implemented as an array of pixel circuits—signal processing circuitry, and associated control or timing circuitry. In a typical arrangement, an image sensor may comprise light sensitive areas or pixels are arranged in a two-dimensional array having multiple rows and columns of pixels. Each pixel generates an electrical charge in response to receiving photons as a result of being exposed to incident light. For example, each pixel can include a photodiode that generates charge in an amount that is generally proportional to the amount of light (i.e., the number of photons) incident on the pixel during an exposure period. The charge can then be read out from each of the pixels, for example through peripheral circuitry.

When used as a camera, such as for photography, output of pixel circuits may be used to generate an image or to collect light data associated with a scene. Image sensors may be used for applications outside of photography as well, such as for machine vision applications, telemetry systems, gesture control input devices, and the like.

Multi-resolution and low power are requirements for computer vision applications such as augmented-reality applications, including augmented-reality glasses for example, and virtual-reality applications. Conventional image sensors, however, cannot meet the demands of such applications and thus may be improved. Conventional image sensors, for example, lack flexibility in the binning of pixel signals from photodiodes in different rows and columns. Further, due to the lack of flexibility in binning, power consumption exceeds the requirements of certain applications and frame rate requirements are not met.

SUMMARY

Embodiments of the present disclosure provide image sensors, image sensing methods, and methods for producing image sensors that provide flexible photodiode binning in both horizontal and vertical directions to realize variable resolutions without digital binning, resulting in higher pixel average accuracy. The systems and methods described herein provide a reduction in power consumption as compared to conventional pixel arrays. Further, black level error is reduced by making a SEL2 signal on overlap with a reset (RST) signal and a TRG signal on to prevent a high impedance ("Hi-Z") node during RST and TRG toggling. An image sensor in accordance with embodiments of the present disclosure includes a sensor substrate having a plurality of pixels. Each pixel in the plurality of pixels includes a plurality of sub-pixels or pixel cells may be arranged in rows and/or columns. Each pixel cell may be configured to generate a respective image signal in response to incident light. Each pixel cell may comprise a floating diffusion configured to receive image charge generated by one or more photodiodes of the respective pixel cell. In some embodiments, a first transistor may be coupled to a floating diffusion of a first pixel cell of the plurality of pixel cells and a floating diffusion of a second pixel cell of the plurality of pixel cells. The first pixel cell and the second pixel cell may be in different rows of the pixel array. In some embodiments, a second transistor may be coupled to the floating diffusion of the first pixel cell and a floating diffusion of a third pixel cell of the plurality of pixel cells. The first pixel cell and the third pixel cell may be in different columns of the pixel array. The first transistor may enable vertical binning and the second transistor may enable horizontal binning.

In some embodiments, each pixel cell may comprise a plurality of photodiodes configured to generate image charge in response to the incident light. A source follower transistor may be coupled to a respective floating diffusion to generate a respective image signal in response to an image charge in the respective floating diffusion. A first row select transistor may be coupled to the source follower transistor to output the respective image signal of the pixel cell. In certain embodiments, the first pixel cell may be configured to output a first pixel signal to a first bitline, the second pixel cell may be configured to output a second pixel signal to a second bitline, and the third pixel cell may be configured to output a third pixel signal to a third bitline.

In some embodiments, the first pixel cell may be configured to output a first pixel signal to a first bitline, the second pixel cell may be configured to output a second pixel signal to the first bitline, and the third pixel cell may be configured to output a third pixel signal to a second bitline.

In some embodiments, the first pixel cell may be configured to output a first pixel signal to a first bitline, the second pixel cell may be configured to output a second pixel signal to a second bitline, and the third pixel cell may be configured to output a third pixel signal to the second bitline.

In one or more of the embodiments described herein, the first pixel cell and the second pixel cell may each output a respective pixel signal in response to a common selection signal.

In one or more of the embodiments described herein, the first pixel cell and the third pixel cell may each output a respective pixel signal in response to a common selection signal.

In one or more of the embodiments described herein, an imaging system may comprise a substrate, a pixel array formed in the substrate, and readout circuitry coupled to the pixel array to readout image data from the pixel array. The pixel array may comprise a plurality of pixel cells arranged in rows and columns. Each pixel cell may be configured to generate a respective image signal in response to incident light. Each pixel cell may comprise a floating diffusion configured to receive image charge generated by one or more photodiodes of the respective pixel cell. A first transistor may be coupled to a floating diffusion of a first pixel cell of the plurality of pixel cells and a floating diffusion of a second pixel cell of the plurality of pixel cells. The first pixel cell and the second pixel cell may be in different rows of the pixel array. A second transistor may be coupled to the floating diffusion of the first pixel cell and a floating diffusion of a third pixel cell of the plurality of pixel cells. The first pixel cell and the third pixel cell may be in different columns of the pixel array. The first transistor may enable vertical binning and the second transistor may enable horizontal binning.

In one or more of the embodiments described herein, each pixel cell comprises a plurality of photodiodes configured to generate image charge in response to the incident light, a source follower transistor coupled to a respective floating diffusion to generate the respective image signal in response to the image charge in the respective floating diffusion, and a first row select transistor coupled to the source follower transistor to output the respective image signal of the pixel cell.

In one or more of the embodiments described herein, the first pixel cell may be configured to output a first pixel signal to a first bitline, the second pixel cell may be configured to output a second pixel signal to a second bitline, and the third pixel cell may be configured to output a third pixel signal to a third bitline.

In one or more of the embodiments described herein, the first pixel cell may be configured to output a first pixel signal to a first bitline, the second pixel cell is configured to output a second pixel signal to the first bitline, and the third pixel cell is configured to output a third pixel signal to a second bitline.

In one or more of the embodiments described herein, the first pixel cell may be configured to output a first pixel signal to a first bitline, the second pixel cell may be configured to output a second pixel signal to a second bitline, and the third pixel cell may be configured to output a third pixel signal to the second bitline.

In one or more of the embodiments described herein, the first pixel cell and the second pixel cell may each output a respective pixel signal in response to a common selection signal. In one or more of the embodiments described herein, the first pixel cell and the third pixel cell may each output a respective pixel signal in response to a common selection signal.

Embodiments of the present disclosure include an imaging system comprising: a pixel array comprising: a plurality of pixel cells arranged in rows and columns, wherein each pixel cell is configured to generate a respective image signal in response to incident light, wherein each pixel cell comprises a floating diffusion configured to receive image charge generated by one or more photodiodes of the respective pixel cell; a first transistor coupled to a floating diffusion of a first pixel cell of the plurality of pixel cells and a floating diffusion of a second pixel cell of the plurality of pixel cells, wherein the first pixel cell and the second pixel cell are in different rows of the pixel array; and a second transistor coupled to the floating diffusion of the first pixel cell and a floating diffusion of a third pixel cell of the plurality of pixel cells, wherein the first pixel cell and the third pixel cell are in different columns of the pixel array; and one or more lenses.

Methods for producing an image sensor in accordance with embodiments of the present disclosure include applying CMOS production processes to produce an array of pixels in accordance with one or more of the embodiments described herein. Additional features and advantages of embodiments of the present disclosure will become more readily apparent from the following description, particularly when considered together with the accompanying drawings.

In this manner, the above aspects of the present disclosure provide for improvements in at least the technical field of image sensor technology as well as in related technical fields of imaging, image processing, and the like.

The present disclosure can be embodied in various forms, including hardware or circuits controlled by computer-implemented methods, computer program products, computer systems and networks, user interfaces, and application programming interfaces; as well as hardware-implemented methods, signal processing circuits, image sensor circuits, application specific integrated circuits, field programmable gate arrays, and the like. The foregoing summary is intended solely to give a general idea of various aspects of the present disclosure and does not limit the scope of the disclosure in any way.

BRIEF DESCRIPTION OF THE DRAWINGS

These and other more detailed and specific features of various embodiments are more fully disclosed in the following description, reference being had to the accompanying drawings, in which.

DETAILED DESCRIPTION

In the following description, numerous details are set forth, such as circuit and timing diagrams and system configurations. It will be readily apparent to one skilled in the art that these specific details are merely exemplary and not intended to limit the scope of this application.

Moreover, while the present disclosure focuses mainly on examples in which the processing circuits are used in image sensors, it will be understood that this is merely one example of an implementation. It will further be understood that the disclosed devices, methods, and systems may be used in any device in which there is a need to detect light information using an image sensor.

Various examples directed to an imaging system with pixel cells including pixel cells with transistors enabling both horizontal and vertical pixel binning are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

As will be discussed, various examples of an imaging system with an array of pixel cells capable of horizontal and/or vertical pixel binning to support both high resolution image capture as well as high-speed high-definition video are disclosed. In various examples, pixel cells with two-by-four photodiodes are provided which are capable of utilizing multiple shared pixel cell units using one or both of vertical and horizontal binning across rows and/or columns within a pixel array. It should be appreciated, however the same or similar principles may be applied to layouts of pixel cells with other than two-by-four photodiodes, such as two-by-two, four-by-four, etc.

As pixel cell technology advances, pixel sizes in image sensors have decreased while image sensor resolution has generally increased. Arrangements of color filter array patterns have similarly changed. Pixel binning may be used to increase image sensor sensitivity by adding or combining pixel image charges from a plurality of pixels. Using pixel binning as described herein, color filter array patterns may be grouped to accommodate different configurations of pixels.

As described herein, a 2×4 pixel cell unit in a first row and a first column may be binned together with a 2×4 pixel cell unit in a second row and/or a second column. In some embodiments, pixel cell units of a same color (e.g., red, green, blue) may be binned together to output a single image data signal.

Figure 1:
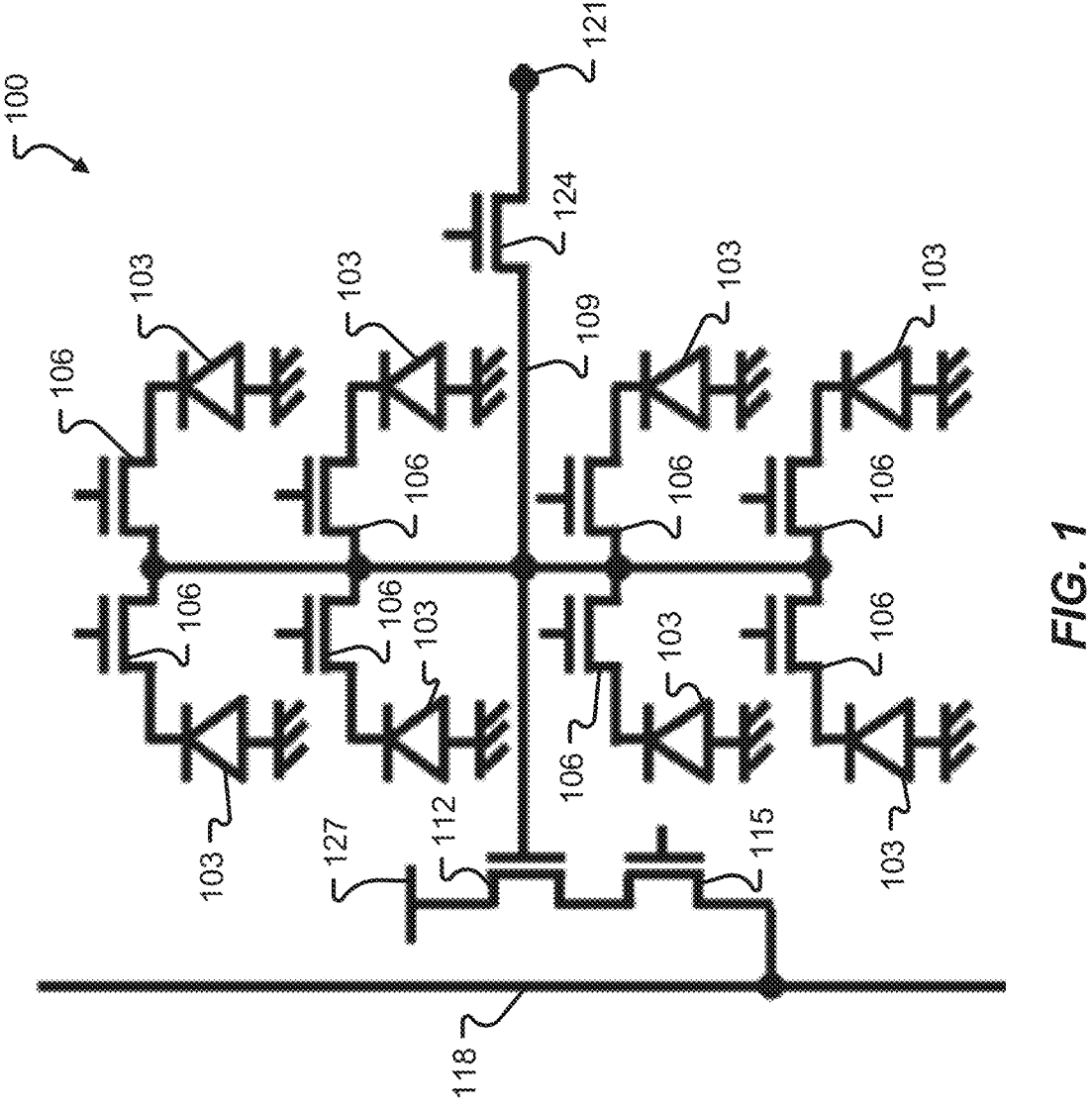
FIGS. 1-11 depict circuit diagrams of pixel arrays in accordance with embodiments of the present disclosure.

FIG. 1 is a circuit diagram or schematic illustrating an exemplary pixel cell 100 according to various aspects of the present disclosure. A pixel array may comprise a grid of pixel cells and, as illustrated in FIG. 1, a pixel cell 100 in a pixel array may comprise a group of photoelectric conversion devices, e.g., photodiodes 103.

While in the example pixel cell 100 of FIG. 1, a group of eight photodiodes 103 arranged in a two by four layout are illustrated, it should be appreciated, the same or similar systems may be established using any number of photodiodes 103 in any arrangement. For example, the photodiodes may be arranged for 2×N photodiode sharing, where N is any positive integer.

Each photodiode 103 may be coupled to a transfer transistor 106. The gate of each transfer transistor 106 may be coupled to be controlled to a transfer control signal. Each transfer transistor 106 may be coupled to a floating diffusion 109 for the pixel cell 100. A charge photogenerated in each photodiode 103 in response to incident light may be transferred to the floating diffusion 109 in response to a respective transfer control signal.

The floating diffusion 109 for each pixel cell 100 or group of photodiodes 103 may be coupled to a gate of a source follower transistor 112. The drain of the source follower transistor 112 may be coupled to a voltage supply 127. The source of the source follower transistor 112 may be coupled to a row select transistor 115. In operation, the row select transistor 115 may be coupled to a bitline 118, which may also be referred to as a signal line, to output a data signal (e.g., image data) from the source follower transistor 112 of pixel cell 100 to in response to a row select signal applied to the gate of the row select transistor 115. The bitline 118 may be referred to in some embodiments as a vertical signal line and may be used to read a pixel signal generated by one or more of the photodiodes 103. The floating diffusion of each cell may be coupled to a node 121 via a reset transistor 124 ("RST"). To the pixel configuration of FIG. 1, a floating diffusion gate ("FDG") transistor as described herein may be added to enable horizontal floating diffusion ("FD") binning between two adjacent FD nodes, and a floating diffusion horizontal ("FDH") transistor and a floating diffusion interconnect ("FDI") transistor may be added to enable flexible horizontal and vertical binning respectively as described herein.

Figure 2:
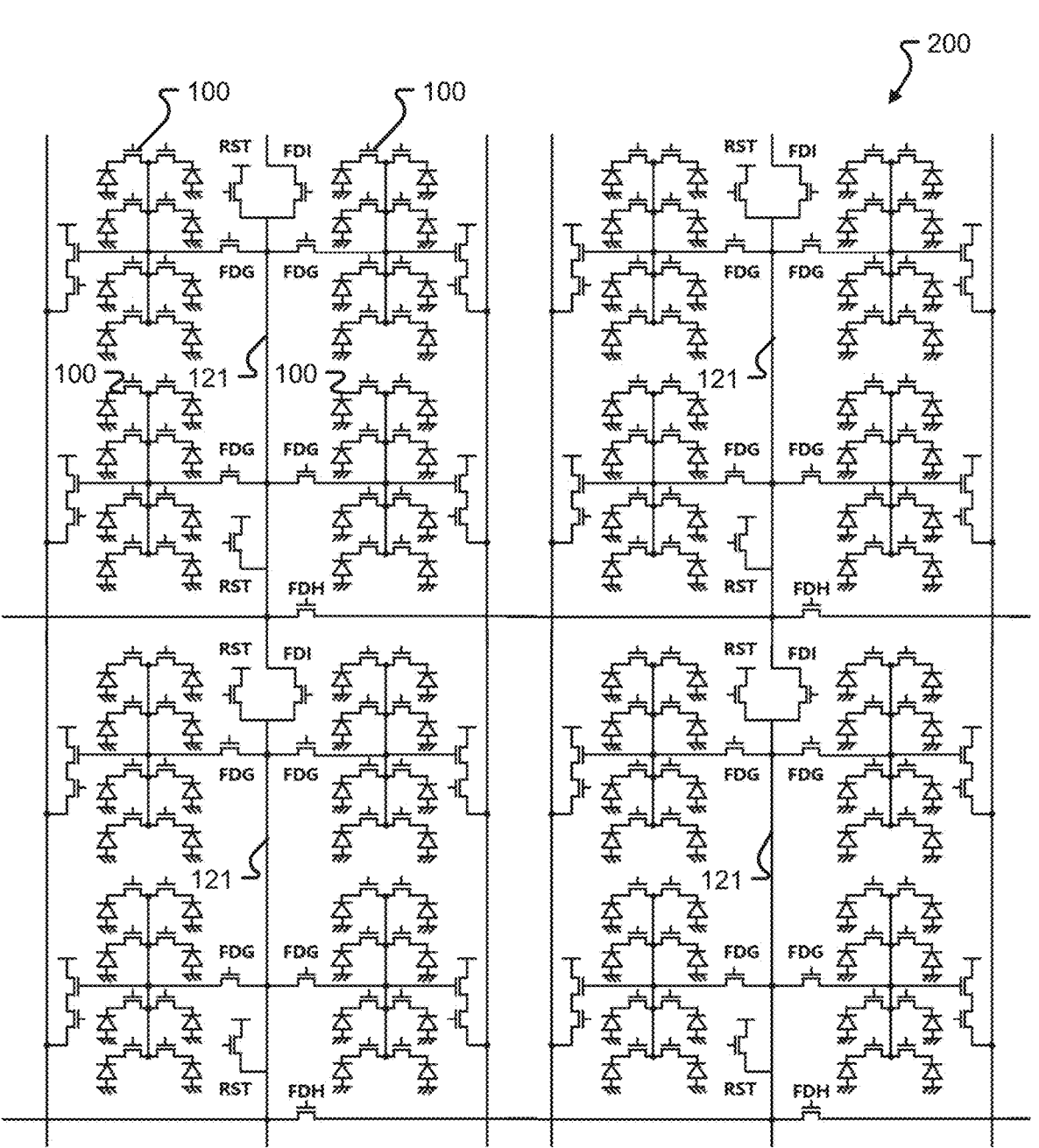

A pixel cell 100 may be connected to other pixel cells in a pixel array 200 such as illustrated in FIG. 2. The pixel cells may be arranged in, for example, rows and columns. As illustrated in FIG. 2, a pixel array 200 may comprise a plurality of pixel cells 100 arranged in a grid or an array. In the example illustrated in FIG. 2, each pixel cell comprises 2×4 photodiodes. Each pixel cell 100 may be connected to node 121 via an FDG transistor. As should be appreciated, when FDG is turned on, the node 121 may switch from a VDD node to an FD node.

Each node 121 of each pixel cell 100 may be coupled to a node 121 of a cell in a row above and in a row below the pixel cell 100 either directly for an always-on connection, or indirectly via an FDI transistor for a selectively-on connection. Each FDI transistor may in some embodiments be paired with a reset transistor RST. Each FDI transistor may be controlled independently by, for example, an FDI control signal applied to its gate. In this way, vertical binning may be achieved through the control of the FDI transistors.

Further, each node 121 may be connected to a node 121 of a cell in a column to the left and/or a column to the right via an FDH transistor. Each FDH transistor may in some embodiments be paired with a reset transistor RST. Each FDH transistor may be controlled independently by an FDH control signal applied to its gate. In this way, horizontal binning may be achieved through the control of the FDH transistors.

With the FDH transistors connecting pixel cells in a horizontal direction and FDI transistors connecting pixel cells in a vertical direction, it should be appreciated that the pixel array 200 may be programmed to be linked in a (2×N)×(2×N) pattern. In this way, FDH transistors enable horizontal binning of pixel signals, i.e., the binning of pixel signals originating in pixel cells in different columns. Similarly, FDI transistors enable vertical binning of pixel signals, i.e., the binning of pixel signals originating in pixel cells in different rows. As described herein, this system of using FDI transistors to enable vertical binning and using FDH transistors to enable horizontal binning may result in a variety of embodiments. As should be appreciated, certain aspects of different embodiments may be used in combination with other aspects of other embodiments.

Figure 3:
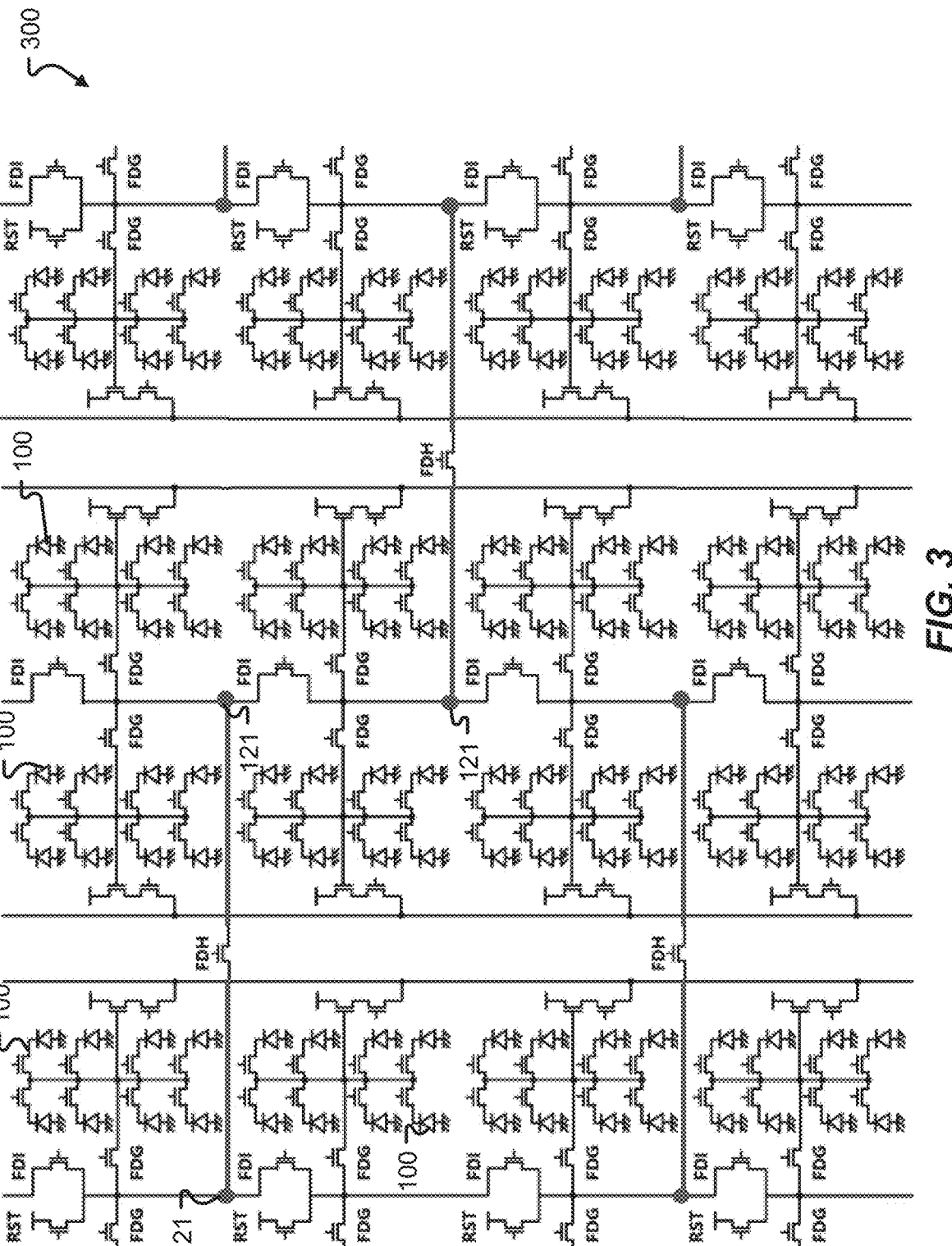

As illustrated in FIG. 3, a pixel array 300 may comprise a plurality of pixel cells 100 arranged in a grid. Each pixel cell 100 of the pixel array 300 is coupled to a node 121 via an FDG transistor. Each node 121 is coupled to two-pixel cells 100 via respective FDG transistors. Each node 121 is coupled to a node 121 in a row above and in a row below via respective FDI transistors and to a node 121 in a column to one of the left or to the right via an FDH transistor.

While the pixel array 200 of FIG. 2 included an RST transistor for each FDH transistor and each FDI transistor, the pixel array 300 may be implemented without an RST transistor paired with each FDH transistor and with an RST transistor paired with FDI transistors only in every other column. Effectively, an RST from every other column may be converted to an FDH which enables reduced FD capacitance and increases conversion gain in binning modes.

With the FDH transistors connecting the pixel cells in a horizontal direction and FDI transistors connecting pixel cells in a vertical direction, the pixel cells can be programmed to be linked in a (2×N)×(2×N) pattern. The FDH transistors enable horizontal binning while the FDI transistors enable vertical binning.

Figure 4:

Similarly, as illustrated in FIG. 4, a pixel array 400 may be implemented with an RST transistor paired with every other FDI transistor in each column. Effectively, an RST transistor from every other row may be converted to an FDH. By eliminating one or more RST transistors, photodiode capacitance may be reduced and conversion gain in binning modes may be increased.

Figure 5:
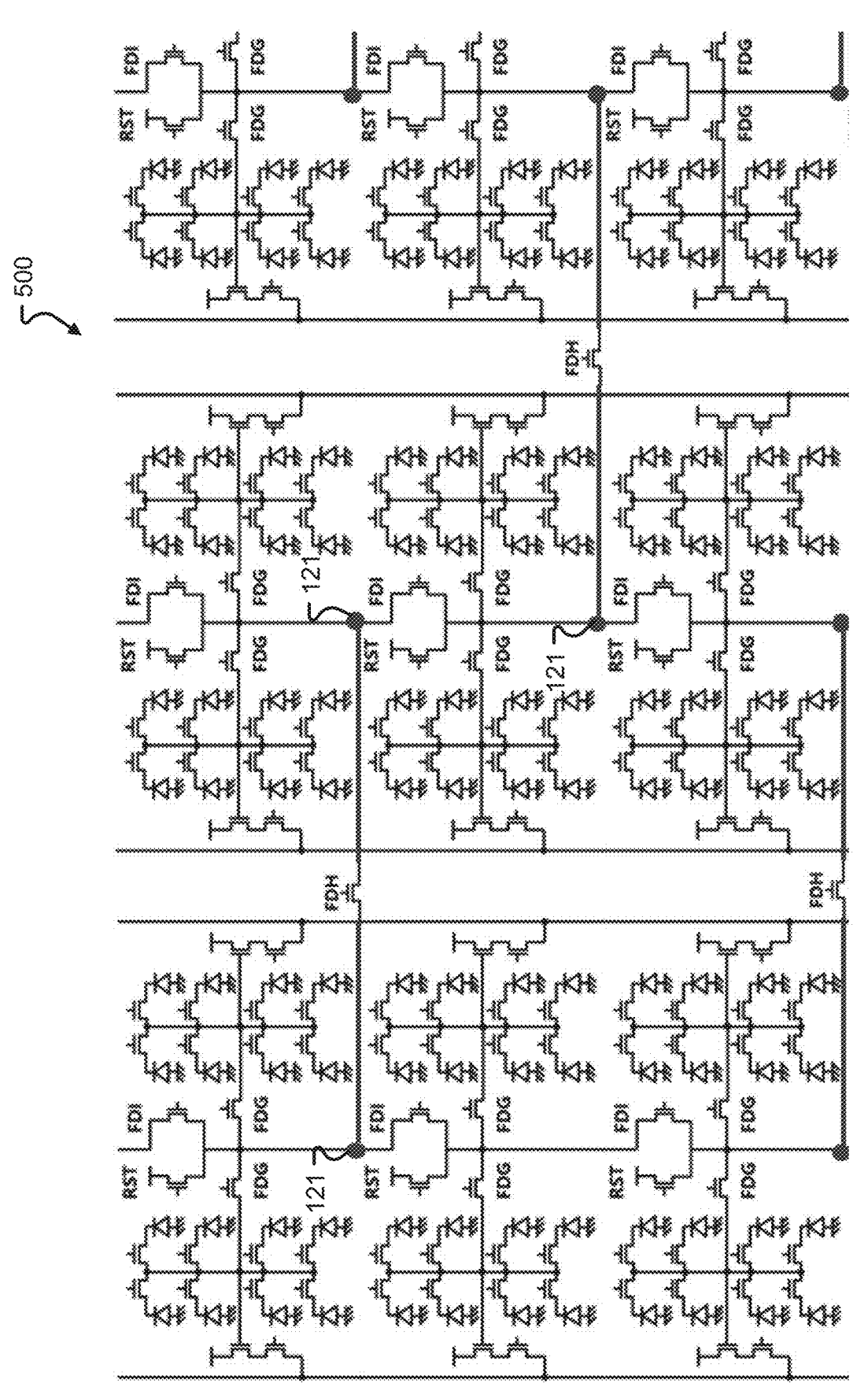
Figure 6:
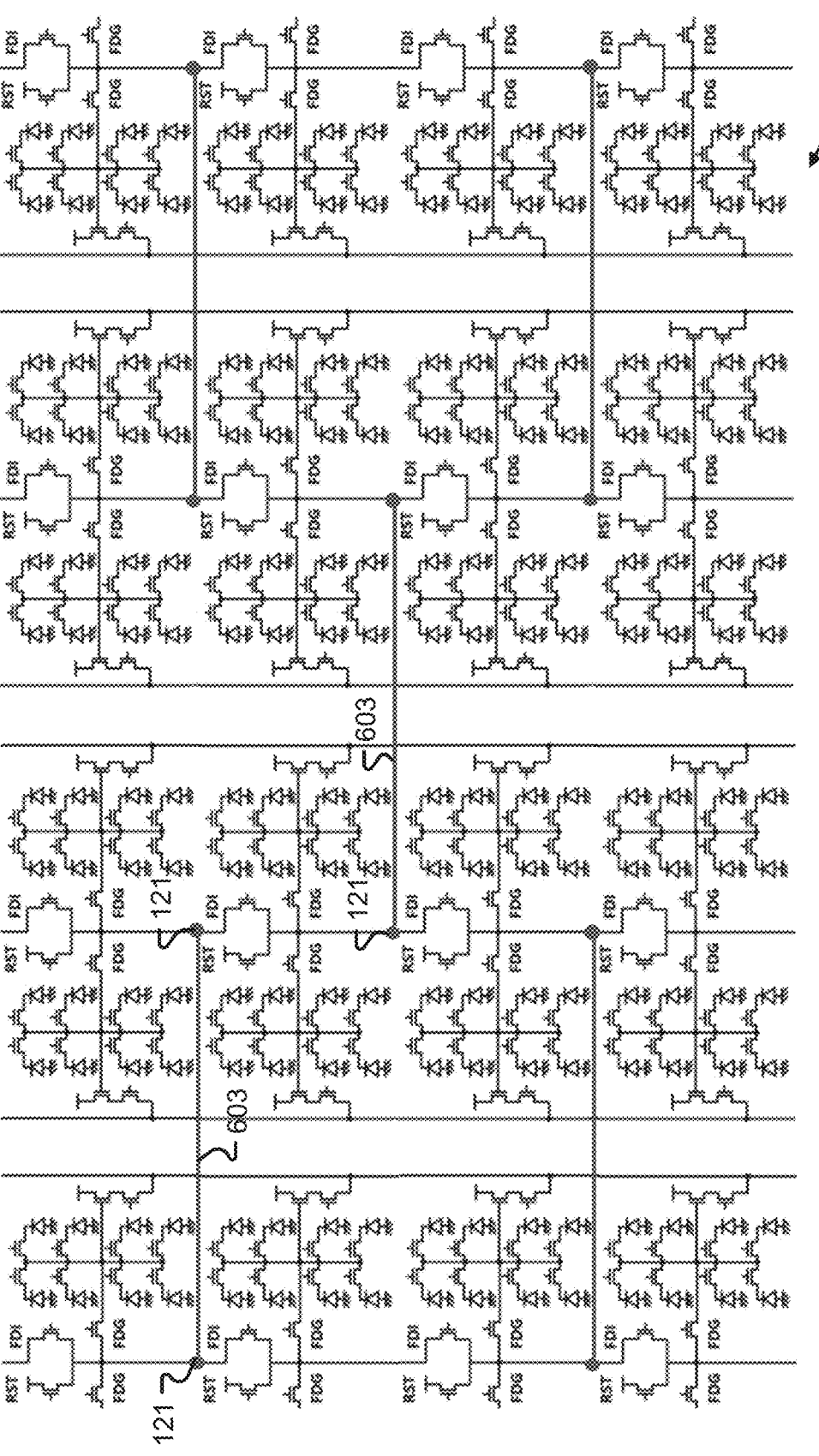

As illustrated in FIG. 5, a pixel array 500 may be implemented with an RST transistor paired with every FDI transistor in each column. Effectively, an RST from every other row may be converted to an FDH which enables reduced photodiode capacitance and increases conversion gain in binning modes. With FDH transistors connecting photodiodes in the horizontal direction and FDI transistors connecting photodiodes in the vertical direction, photodiodes can be programmed to linked in a (2×N)×(2×N) pattern. Unit pixel layout can be a 2×2, 2×4 or 2×N photodiode sharing It should be appreciated a similar embodiment may be arranged, for example, as illustrated in FIG. 6, each node 121 of a pixel array 600 may be connected to a node 121 of a column to the left or to the right via a metal wire 603, thus constantly connecting each node 121 to a node 121 in a different column. With metal wires connecting photodiodes in the horizontal direction and FDI transistors connecting photodiodes in the vertical direction, photodiodes can be programmed to linked in a $(2^{\wedge}N)\times(2^{\wedge}N)$ pattern.

Figure 7:
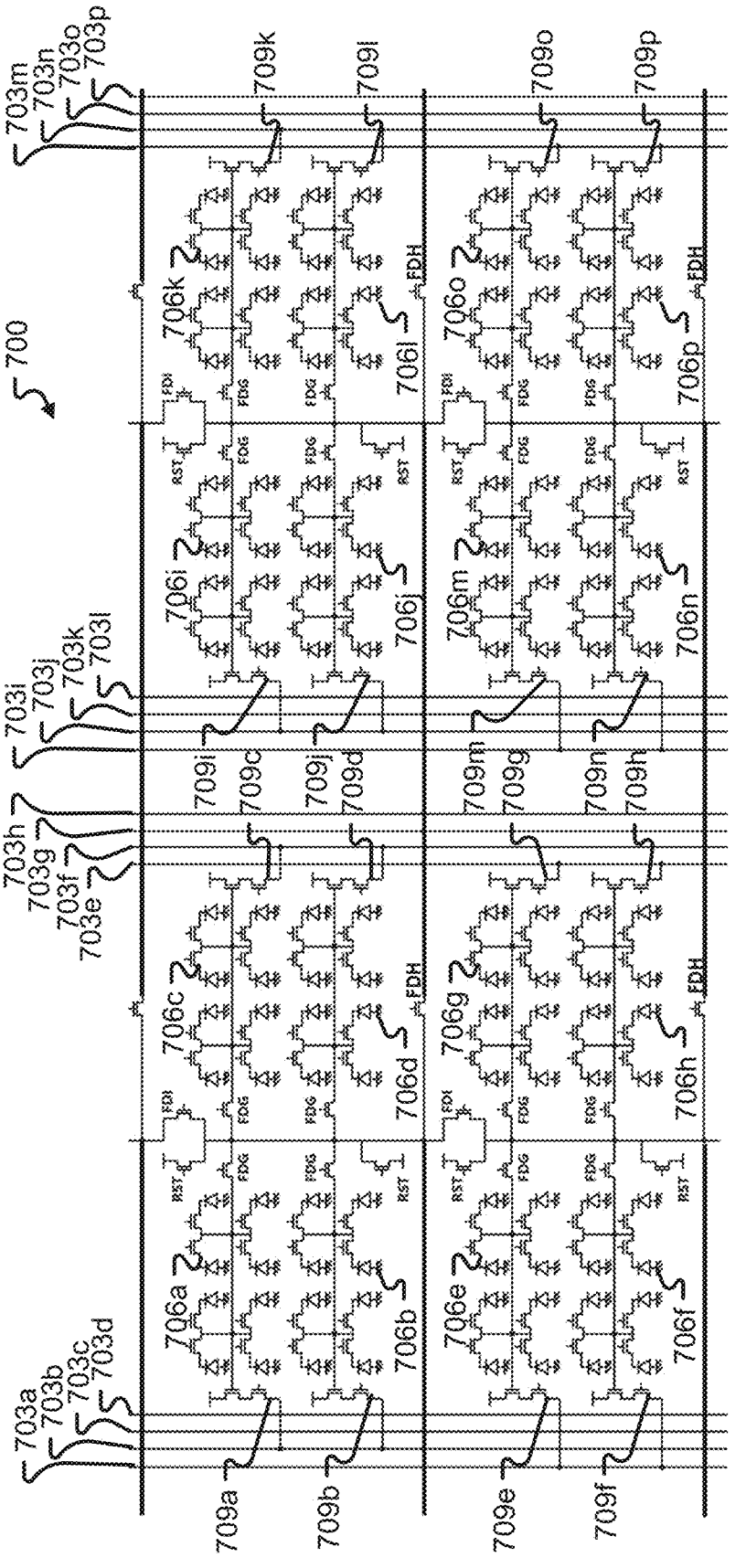

As illustrated in FIG. 7, a pixel array 700 may comprise a number of rows and columns of pixel cells 706*a-p*. Each pixel cell may be connected to a bitline 703*a-p*. As illustrated in FIG. 7, pixel cell 706*a* in a first row and a first column is configured to output a pixel signal to bitline 703*b* via a row select transistor 709*a*. Pixel cell 706*b*, also in a second row and the first column, is also configured to output a pixel signal to bitline 703*b* via a row select transistor 709*b*. In some embodiments, both row select transistor 709*a* and row select transistor 709*b* may be controlled via a same selection signal SEL[1].

Pixel cell 706*c*, in the first row and a second column, is configured to output a pixel signal to bitline 703*f* via a row select transistor 709*c*. Pixel cell 706*d*, in the second row and the second column, is also configured to output a pixel signal to bitline 703*f* via a row select transistor 709*d*. In some embodiments, both row select transistor 709*c* and row select transistor 709*d* may be controlled via a same selection signal SEL[1] which may be the same selection signal used to control row select transistors 709*a* and 709*b*.

Pixel cell 706*e*, in a third row and the first column, is configured to output a pixel signal to bitline 703*a* via a row select transistor 709*e*. Pixel cell 706*f*, in a fourth row and the first column, is also configured to output a pixel signal to bitline 703*a* via a row select transistor 709*f*. In some embodiments, both row select transistor 709*e* and row select transistor 709*f* may be controlled via a same selection signal SEL[0].

Pixel cell 706*g*, in the third row and second column, is configured to output a pixel signal to bitline 703*e* via a row select transistor 709*g*. Pixel cell 706*h*, in the fourth row and the second column, is also configured to output a pixel signal to bitline 703*e* via a row select transistor 709*h*. In some embodiments, both row select transistor 709*g* and row select transistor 709*h* may be controlled via a same selection signal SEL[0] which may be the same selection signal used to control row select transistors 709*e* and 709*f*.

Pixel cell 706*i*, in the first row and a third column, is configured to output a pixel signal to bitline 703*j* via a row select transistor 709*i*. Pixel cell 706*j*, in the second row and the third column, is also configured to output a pixel signal to bitline 703*j* via a row select transistor 709*j* In some embodiments, both row select transistor 709*i* and row select transistor 709*j* may be controlled via a same selection signal SEL[0] which may be the same selection signal used to control row select transistors 709*a-d*.

Pixel cell 706*k*, in the first row and a fourth column, is configured to output a pixel signal to bitline 703*n* via a row select transistor 709*k*. Pixel cell 7061, in the second row and the fourth column, is also configured to output a pixel signal to bitline 703*n* via a row select transistor 7091. In some embodiments, both row select transistor 709*k* and row select transistor 7091 may be controlled via a same selection signal SEL[0] which may be the same selection signal used to control row select transistors 709*a-d*, 709*i*, and 709*j*.

Pixel cell 706*m*, in the third row and the third column, is configured to output a pixel signal to bitline 703*i* via a row select transistor 709*m*. Pixel cell 706*n*, in the fourth row and the third column, is also configured to output a pixel signal to bitline 703*i* via a row select transistor 709*n*. In some embodiments, both row select transistor 709*m* and row select transistor 709*n* may be controlled via a same selection signal SEL[0] which may be the same selection signal used to control row select transistors 709*e-h*.

Pixel cell 706*o*, in the third row and fourth column, is configured to output a pixel signal to bitline 703*m* via a row select transistor 709*o*. Pixel cell 706*p*, in the fourth row and the fourth column, is also configured to output a pixel signal to bitline 703*m* via a row select transistor 709*p*. In some embodiments, both row select transistor 7090 and row select transistor 709*p* may be controlled via a same selection signal SEL[1] which may be the same selection signal used to control row select transistors 709*e-h*, 709*m*, and 709*n*.

Each pixel cell 706*a-p* may be paired with an FDG transistor. FDG transistors may be used to bin pixel signals of neighboring rows and/or columns. For example, any of 706*a-d* may be binned with any other of 706*a-d* through control of FDG transistors; any of 706*e-h* may be binned with any other of 706*e-h* through control of FDG transistors; any of 706*i-1* may be binned with any other of 706*i-l* through control of FDG transistors; and any of 706*m-p* may be binned with any other of 706*m-p* through control of FDG transistors.

FDH transistors may be placed throughout a pixel array enabling horizontal binning. For example, any of 706*a-d* may be binned with any of 706*i-1* through control of both FDG transistors and an FDH transistor, and any of 706*e-h* may be binned with any of 706*m-p* through control of both FDG transistors and an FDH transistor.

FDI transistors may be placed throughout a pixel array enabling vertical binning. For example, any of 706*a-d* may be binned with any of 706*e-h* through control of both FDG transistors and an FDI transistor, and any of 706*i-1* may be binned with any of 706*m-p* through control of both FDG transistors and an FDI transistor.

While the pixel array 700 is illustrated as having sixteen pixel cells, it should be appreciated the pixel array 700 may have any number of pixel cells in any number of rows and/or columns. Pixel cells may be configured to output pixel signals to any of bitlines 703*a-p*.

Figure 8:
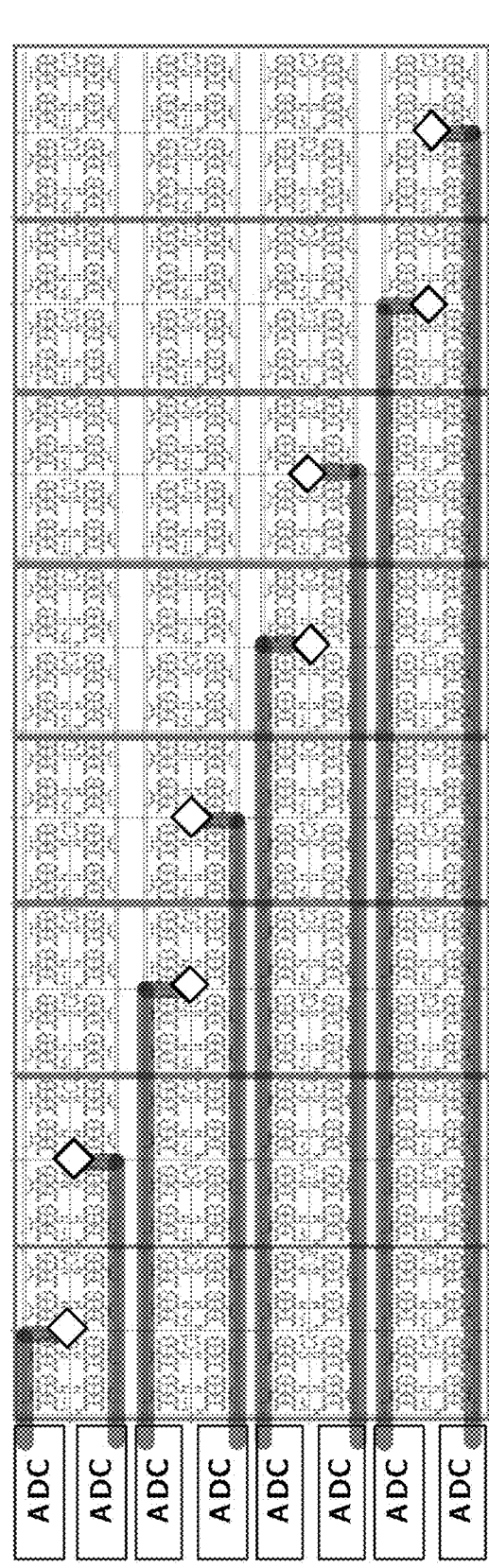

For example, as illustrated in FIG. 8, a pixel array 800 may comprise eight pixel cells in a horizontal direction and thirty-two pixel cells in a vertical direction. Each bitline may be connected to an ADC. Through control of row select transistors, FDG transistors, FDI transistors, and FDH transistors, a number of binning arrangements may be enabled. The pixel array 800 may comprise pixel cells arranged as illustrated in any of FIGS. 1-7.

With extending horizontal photodiode binning via FDH transistors, the number of parallel readout can be increased for higher photodiode binning modes (>2 photodiodes in the horizontal direction). Power may further be reduced with reduced read periods and by reducing the number of required column ADC.

Figure 9:
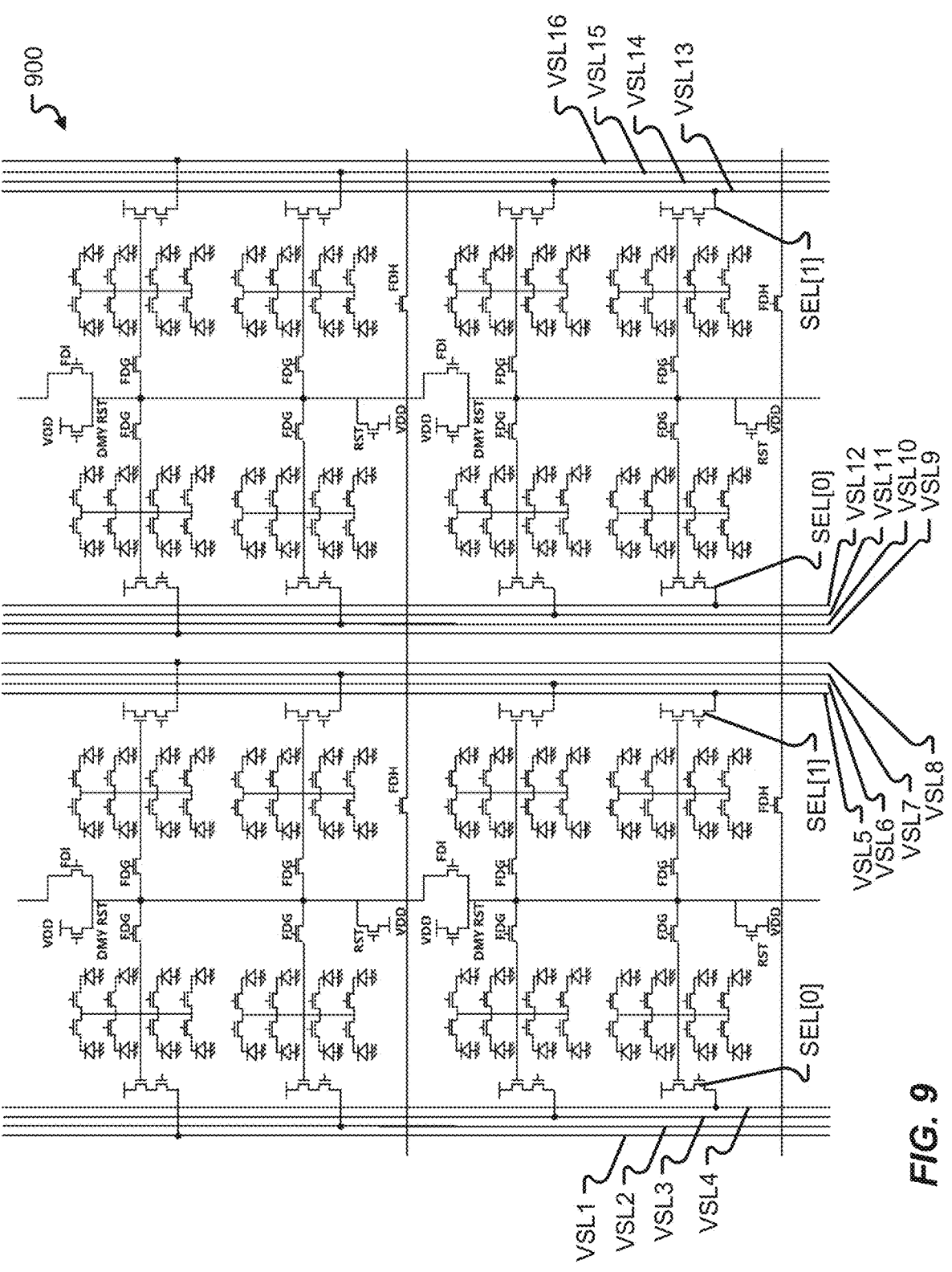

As illustrated in FIG. 9, a pixel array 900 may be implemented in which each pixel cell may be configured to output to a separate bitline, VSL 1-16. In the example illustrated in FIG. 9, two row selector signals SEL[0], SEL[1] are used, though it should be appreciated any number of row selector signals may be used.

Figure 10:
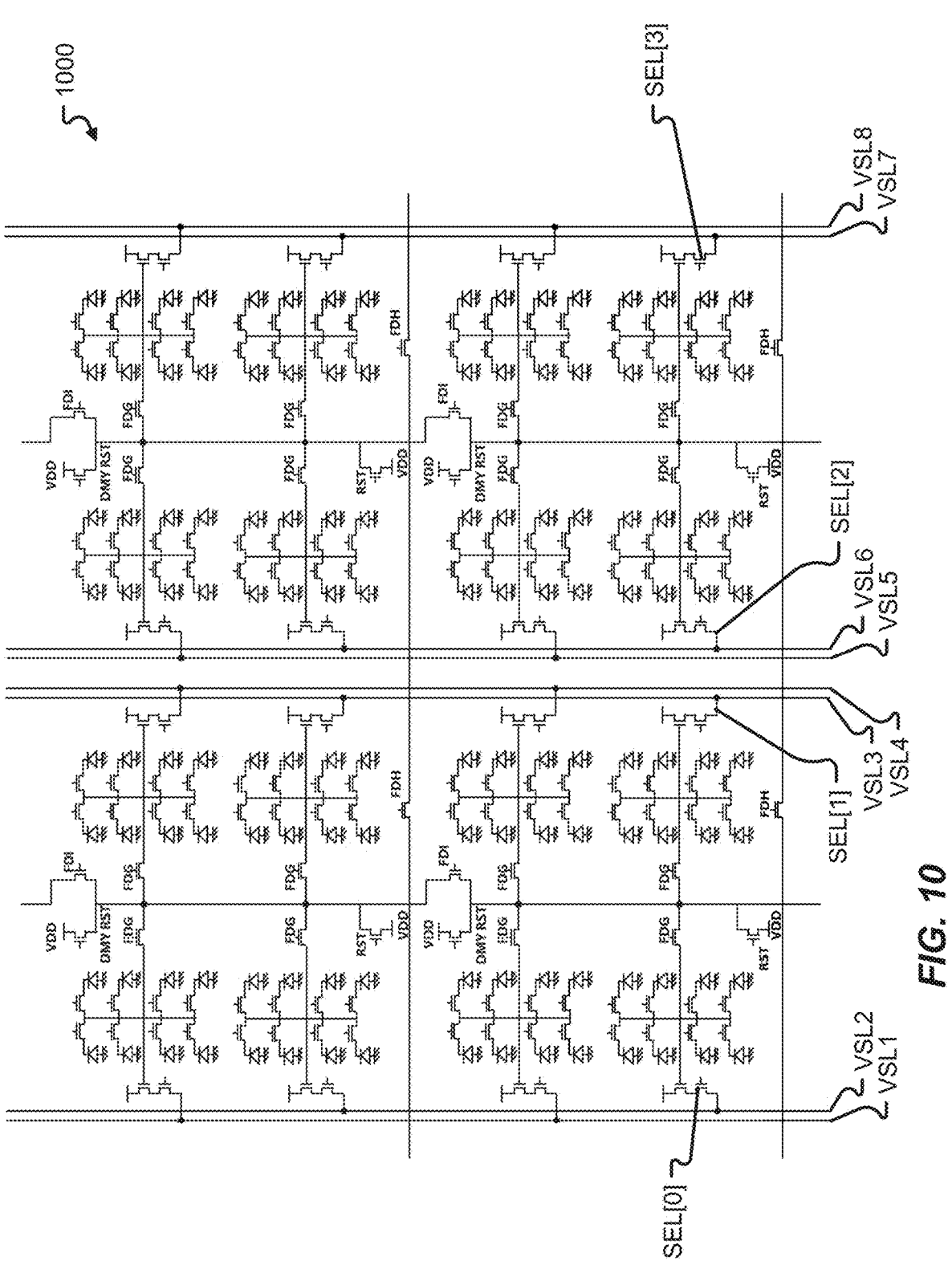

As illustrated in FIG. 10, a pixel array 1000 may be implemented in which pixel cells in every other row of the same column may output to a same bitline. In the example illustrated in FIG. 10, four row selector signals SEL[0]-[3] are used, though it should be appreciated any number of row selector signals may be used.

Figure 11:
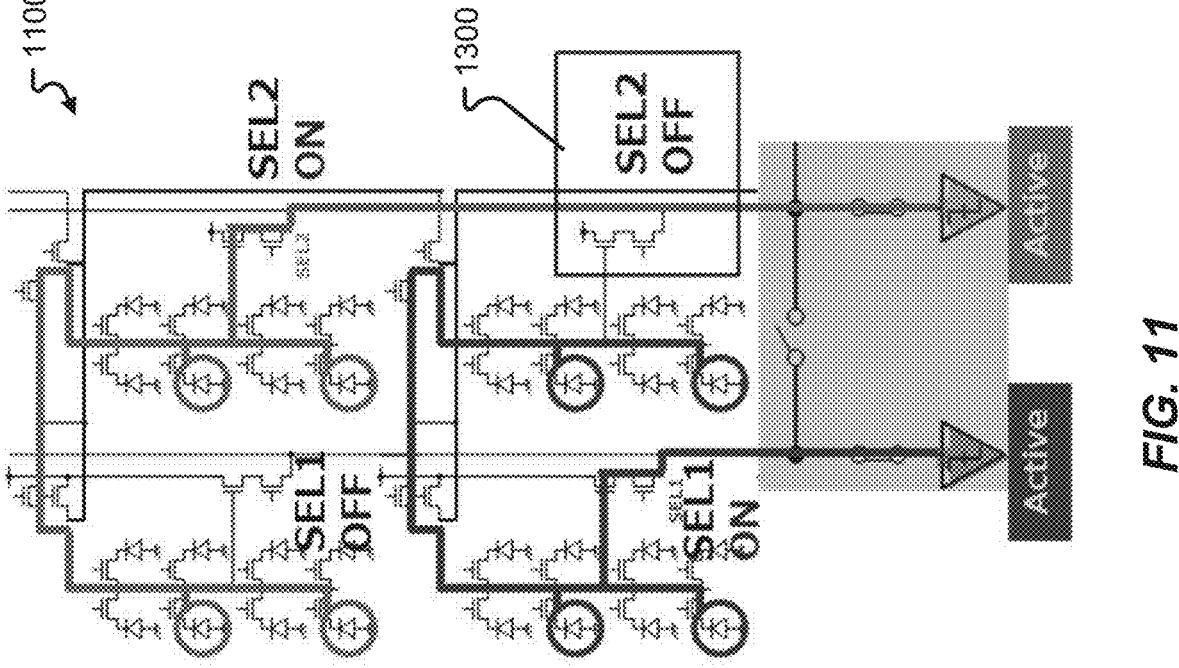

As illustrated in FIG. 11, a pixel array may comprise four pixel cells. Each pixel cell may comprise eight photodiodes in a two-by-four layout. By controlling transfer transistors, FDG transistors, FDI transistors, and FDH transistors, a variety of output arrangements may be achieved. In the example illustrated in FIG. 11, two photodiodes from each of the four pixel cells are activated through the controlling of transfer transistors. The pixel signal from the top left pixel cell is horizontally binned with the top right pixel cell and the bottom left pixel cell is horizontally binned with the bottom right pixel cell.

The pixel array 1100 includes four row selection transistors 1300. A detailed illustration of a row selection transistor 1300 circuit is illustrated in FIG. 13 and described in greater detail below.

Figure 12:
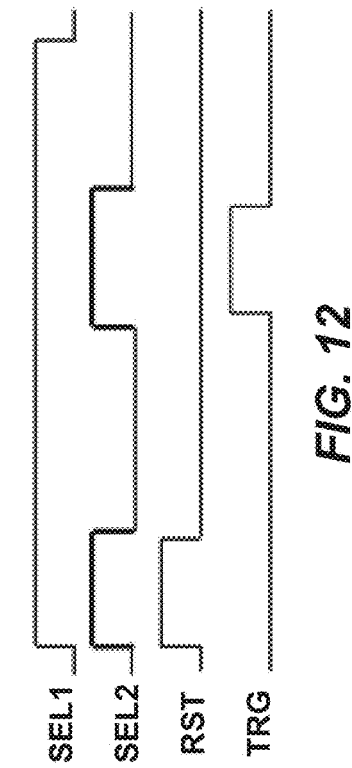
FIG. 12 depicts a timing diagram in accordance with embodiments of the present disclosure.

As illustrated in FIG. 12, SEL1 and SEL2 may be independently turned on and off. In some embodiments, only one SEL is turned on during read in horizontal 2-photodiode sharing pixels at FD binning modes.

Figure 13:
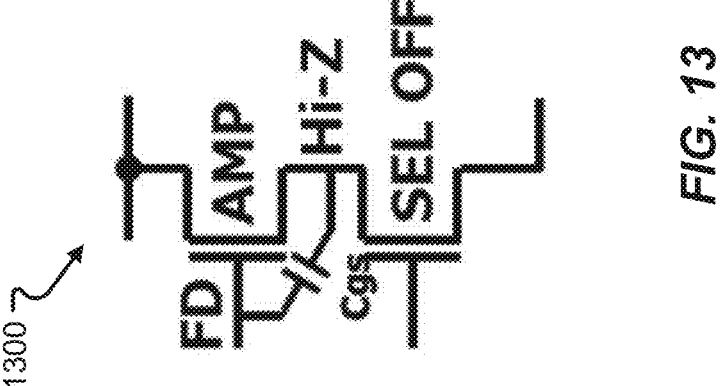
FIG. 13 depicts a circuit diagram including an amplifier transistor and a select transistor in accordance with embodiments of the present disclosure.

As illustrated in FIG. 13, a row selection transistor circuit 1300 may comprise a capacitor Cgs connecting the photodiode, or pixel signal, of a pixel cell to a Hi-Z node. The AMP source of SEL-off pixel is at a Hi-Z node. Because of Cgs between the Hi-Z node and the FD node, the FD node would not settle if Hi-Z node does not settle.

Figure 14:
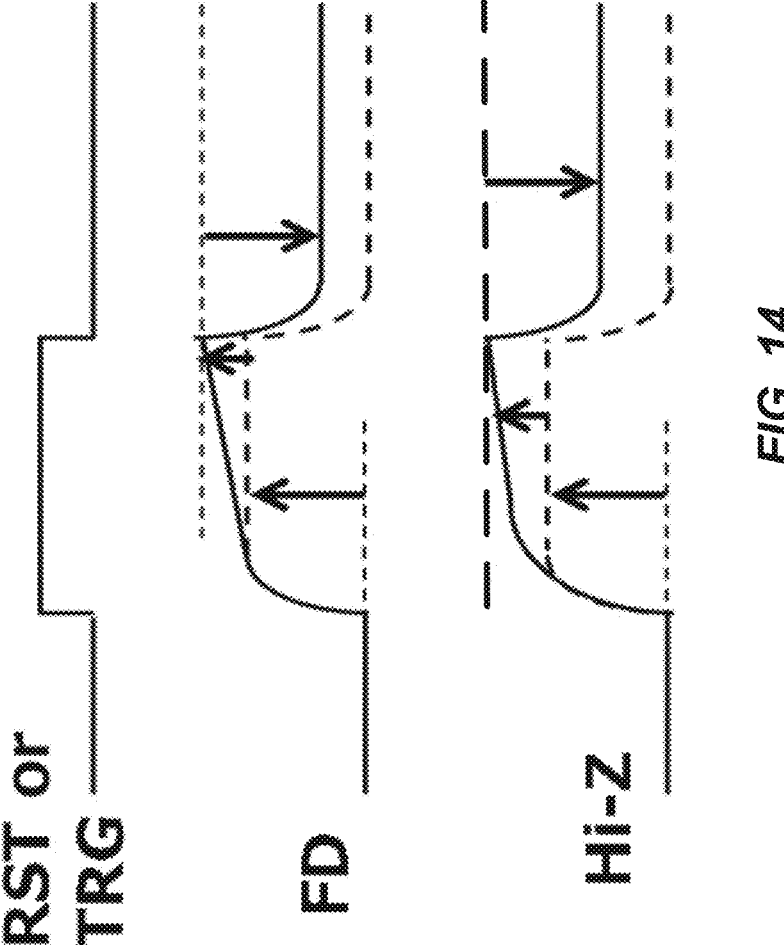
FIG. 14 depicts a timing diagram in accordance with embodiments of the present disclosure.

As illustrated in FIG. 14, an RST or TRG signal may affect the FD and Hi-Z nodes. Because it takes a long time for Hi-Z to return to the original voltage after an RST/TRG fall since AMP R is higher at SEL OFF. Increased color-to-color black level offset, line-to-line black level offset, and DK FPN due to SEL Hi-Z node. Applying SEL2 operation to make SEL2 on overlap with RST/TRG may prevent a Hi-Z node during RST/TRG toggle.

Figure 15:
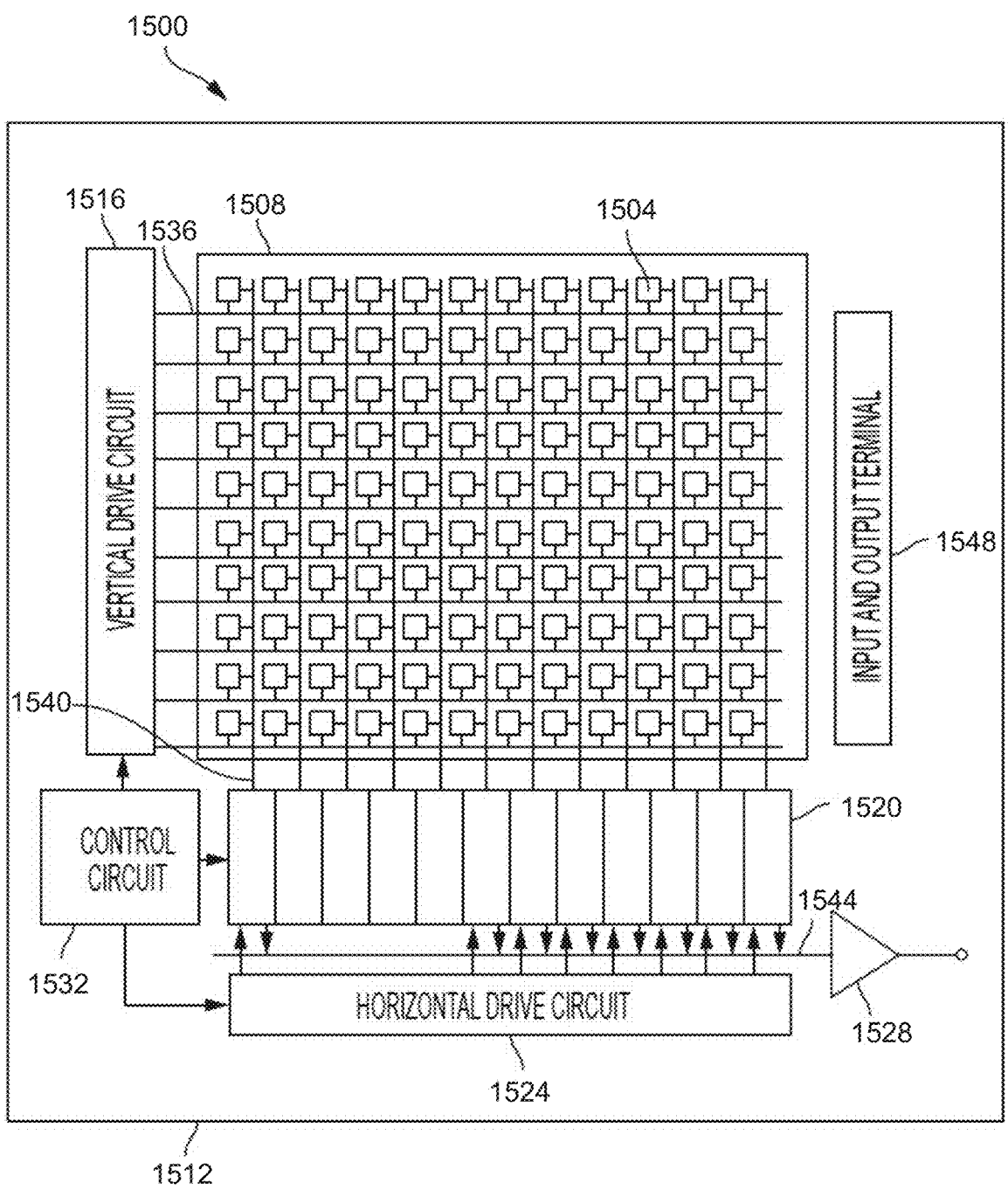
FIG. 15 depicts elements of a color sensing image sensor in accordance with embodiments of the present disclosure.

FIG. 15 is a diagram that depicts elements of a color sensing image sensor or device 1500 in accordance with embodiments of the present disclosure. In general, the color sensing image sensor 1500 includes a plurality of pixels 1504 disposed in an array 1508. More particularly, the pixels 1504 can be disposed within an array 1508 having a plurality of rows and columns of pixels 1504. Moreover, the pixels 1504 are formed in an imaging or semiconductor substrate 1512. In addition, one or more peripheral or other circuits can be formed in connection with the imaging substrate 1512. Examples of such circuits include a vertical drive circuit 1516, a column signal processing circuit 1520, a horizontal drive circuit 1524, an output circuit 1528, and a control circuit 1532. As described in greater detail elsewhere herein, each of the pixels 1504 within a color sensing image sensor 1500 in accordance with embodiments of the present disclosure includes a plurality of photosensitive sites or sub-pixels.

The control circuit 1532 can receive data for instructing an input clock, an operation mode, and the like, and can output data such as internal information related to the image sensor 1500. Accordingly, the control circuit 1532 can generate a clock signal that provides a standard for operation of the vertical drive circuit 1516, the column signal processing circuit 1520, and the horizontal drive circuit 1524, and control signals based on a vertical synchronization signal, a horizontal synchronization signal, and a master clock. The control circuit 1532 outputs the generated clock signal in the control signals to the various other circuits and components.

The vertical drive circuit 1516 can, for example, be configured with a shift register, can operate to select a pixel drive wiring 1536, and can supply pulses for driving sub-pixels of a pixel 1504 through the selected drive wiring 1536 in units of a row. The vertical drive circuit 1516 can also selectively and sequentially scan elements of the array 1508 in units of a row in a vertical direction, and supply the signals generated within the pixels 1504 according to an amount of light they have received to the column signal processing circuit 1520 through a vertical signal line 1540.

The column signal processing circuit 1520 can operate to perform signal processing, such as noise removal, on the signal output from the pixels 1504. For example, the column signal processing circuit 1520 can perform signal processing such as a correlated double sampling (CDS) for removing a specific fixed patterned noise of a selected pixel 1504 and an analog to digital (A/D) conversion of the signal.

The horizontal drive circuit 1524 can include a shift register. The horizontal drive circuit 1524 can select each column signal processing circuit 1520 in order by sequentially outputting horizontal scanning pulses, causing each column signal processing circuit 1522 to output a pixel signal to a horizontal signal line 1544.

The output circuit 1528 can perform predetermined signal processing with respect to the signals sequentially supplied from each column signal processing circuit 1520 through the horizontal signal line 1544. For example, the output circuit 1528 can perform a buffering, black level adjustment, column variation correction, various digital signal processing, and other signal processing procedures. An input and output terminal 1548 exchanges signals between the image sensor 1500 and external components or systems.

Accordingly, a color sensing image sensor 1500 in accordance with at least some embodiments of the present disclosure can be configured as a CMOS image sensor of a column A/D type in which column signal processing is performed and in which vertical binning is achieved binning pixel signals of pixels in different rows of a pixel array and horizontal binning is achieved for binning pixel signals of pixels in different columns of the pixel array.

Figure 16:
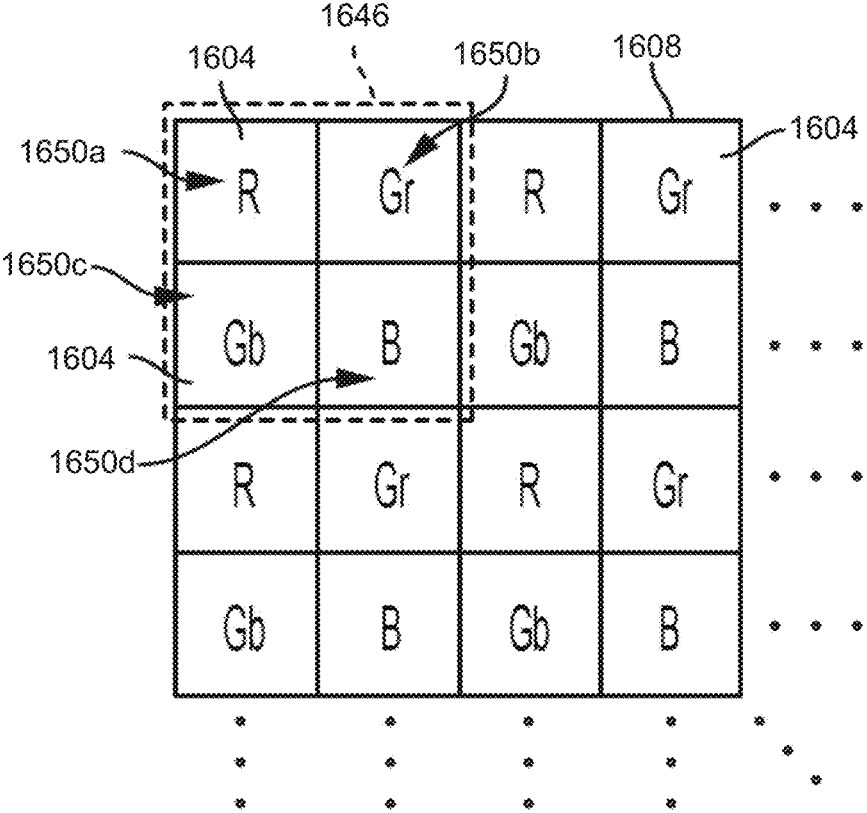
FIG. 16 is a plan view of a portion of an exemplary color sensing image sensor in accordance with the prior art.

With reference now to FIG. 16, portions of a pixel array 1608 of an exemplary color sensing image sensor in accordance with the prior art are depicted. FIG. 16 shows a portion of the pixel array 1608 in a plan view and illustrates how individual pixels 1604 are disposed in 2×2 sets 1646 of four pixels 1604. In this particular example, each 2×2 set 1646 of four pixels 1604 is configured as a so-called Bayer array, in which a first one of the pixels 1604 is associated with a red color filter 1650*a*, a second one of the pixels 1604 is associated with a green color filter 1650*b*, a third one of the pixels 1604 is associated with another green color filter 1650*c*, and fourth one of the pixels 1604 is associated with the blue color filter 1650*d*.

Figure 17:
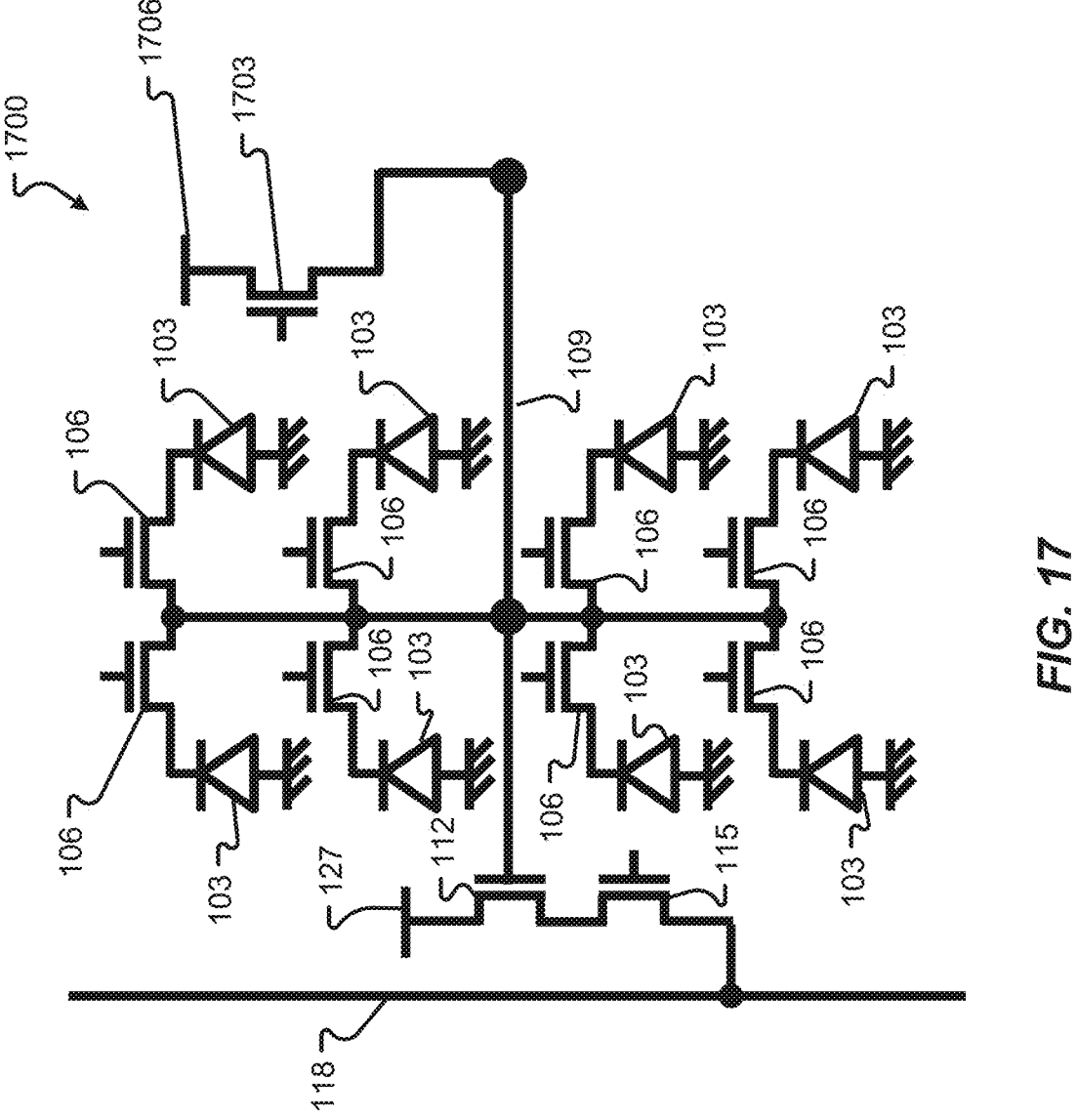
FIGS. 17, 18A, and 18B depict circuit diagrams of pixel arrays in accordance with embodiments of the present disclosure.

Another exemplary circuit diagram 1700 is illustrated in FIG. 17. As should be appreciated, the circuit diagram 1700 is similar to that of FIG. 1, but with a transistor 1703 which may be used to switchably bring the floating diffusion 109 to VDD voltage 1706. Transistor 1703 may be described as a reset or RST transistor. Similarly, as illustrated in FIG. 18A, an FDG transistor 124 may be placed between the floating diffusion 109 and the transistor 1703.

Figure 18B:
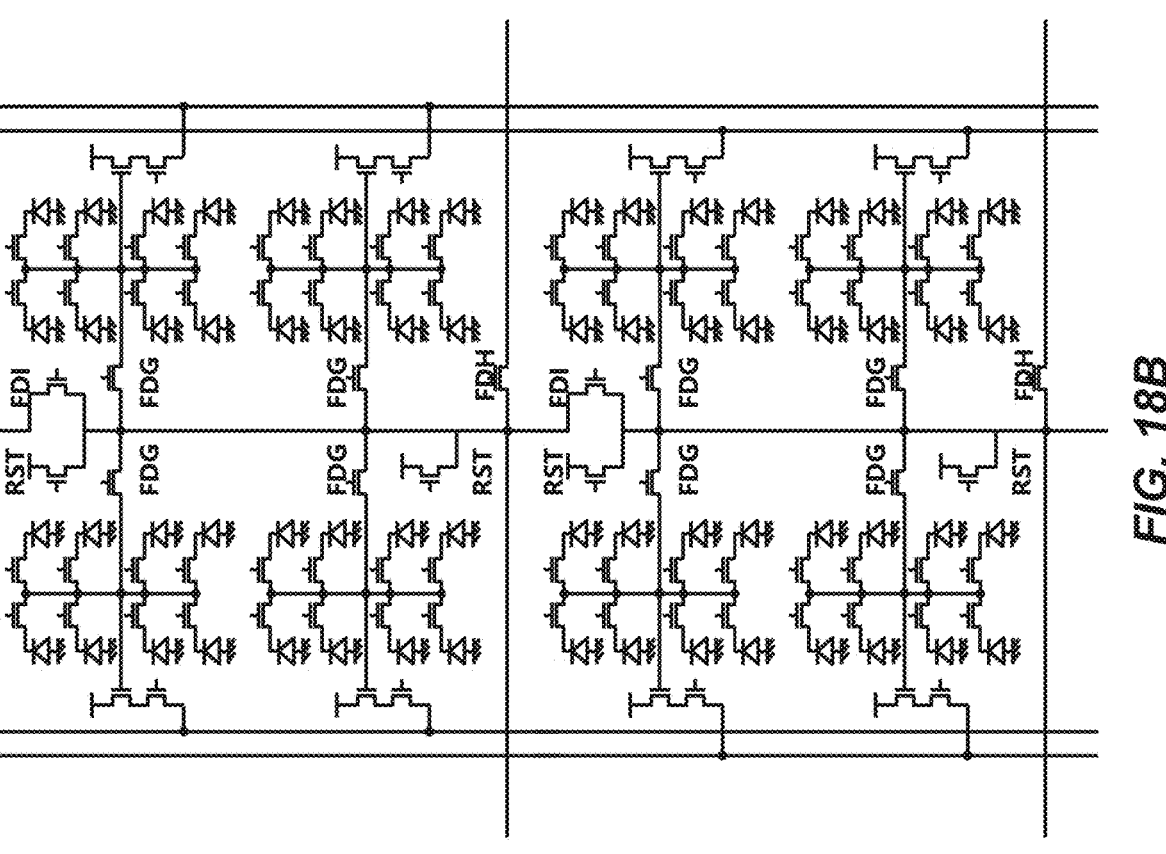
Figure 18A:
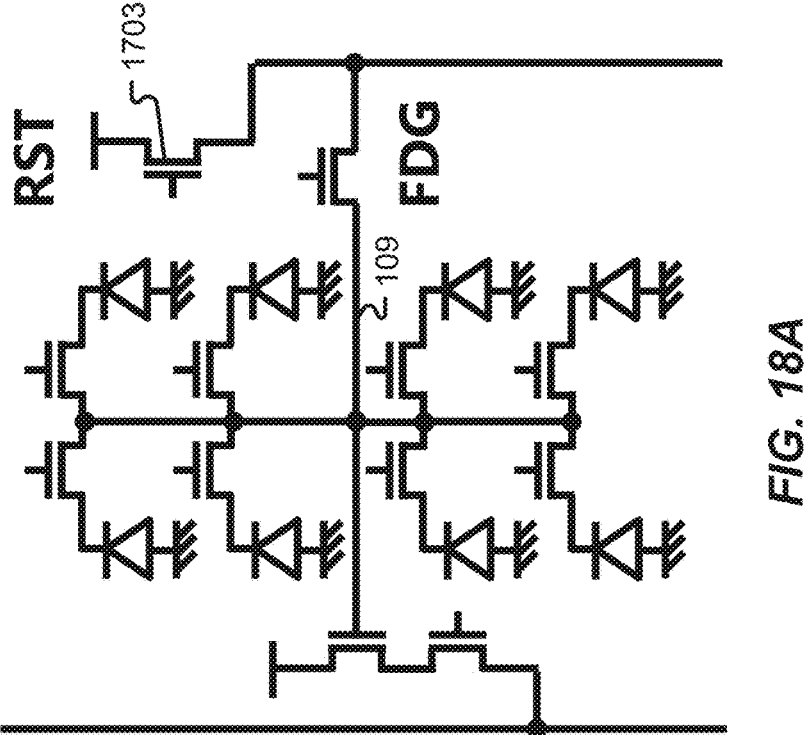

Finally, another exemplary circuit diagram is illustrated in FIG. 18. Similar to FIG. 10, pixel cells in different rows may output to different bitlines. While the embodiments described herein show particular pixel cells outputting to particular bitlines, it should be appreciated that other variations may be used in particular scenarios depending on desired functionality. The contents of this specification should not be considered as being limited to any of the particular layouts illustrated.

The foregoing has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

Embodiments of the present disclosure include an image sensor comprising: a sensor substrate; a pixel array disposed in the sensor substrate, wherein the pixel array comprises: a plurality of pixel cells arranged in rows and columns, wherein each pixel cell is configured to generate a respective image signal in response to incident light, wherein each pixel cell comprises a floating diffusion configured to receive image charge generated by one or more photodiodes of the respective pixel cell; a first transistor coupled to a floating diffusion of a first pixel cell of the plurality of pixel cells and a floating diffusion of a second pixel cell of the plurality of pixel cells, wherein the first pixel cell and the second pixel cell are in different rows of the pixel array; and a second transistor coupled to the floating diffusion of the first pixel cell and a floating diffusion of a third pixel cell of the plurality of pixel cells, wherein the first pixel cell and the third pixel cell are in different columns of the pixel array.

Aspects of the above image sensor include wherein the first transistor enables vertical binning. Aspects of the above image sensor include wherein the second transistor enables horizontal binning.

Aspects of the above image sensor include wherein each pixel cell comprises: a plurality of photodiodes configured to generate image charge in response to the incident light; a source follower transistor coupled to a respective floating diffusion to generate the respective image signal in response to the image charge in the respective floating diffusion; and a first row select transistor coupled to the source follower transistor to output the respective image signal of the pixel cell.

Aspects of the above image sensor include wherein the first pixel cell is configured to output a first pixel signal to a first bitline, the second pixel cell is configured to output a second pixel signal to a second bitline, and the third pixel cell is configured to output a third pixel signal to a third bitline.

Aspects of the above image sensor include wherein the first pixel cell is configured to output a first pixel signal to a first bitline, the second pixel cell is configured to output a second pixel signal to the first bitline, and the third pixel cell is configured to output a third pixel signal to a second bitline.

Aspects of the above image sensor include wherein the first pixel cell is configured to output a first pixel signal to a first bitline, the second pixel cell is configured to output a second pixel signal to a second bitline, and the third pixel cell is configured to output a third pixel signal to the second bitline.

Aspects of the above image sensor include wherein the first pixel cell and the second pixel cell each output a respective pixel signal in response to a common selection signal.

Aspects of the above image sensor include wherein the first pixel cell and the third pixel cell each output a respective pixel signal in response to a common selection signal.

Embodiments of the present disclosure include an imaging system comprising: a substrate; a pixel array formed in the substrate, the pixel array comprising: a plurality of pixel cells arranged in rows and columns, wherein each pixel cell is configured to generate a respective image signal in response to incident light, wherein each pixel cell comprises a floating diffusion configured to receive image charge generated by one or more photodiodes of the respective pixel cell; a first transistor coupled to a floating diffusion of a first pixel cell of the plurality of pixel cells and a floating diffusion of a second pixel cell of the plurality of pixel cells, wherein the first pixel cell and the second pixel cell are in different rows of the pixel array; and a second transistor coupled to the floating diffusion of the first pixel cell and a floating diffusion of a third pixel cell of the plurality of pixel cells, wherein the first pixel cell and the third pixel cell are in different columns of the pixel array; and readout circuitry coupled to the pixel array to readout image data from the pixel array.

Aspects of the above imaging system include wherein the first transistor enables vertical binning.

Aspects of the above imaging system include wherein the second transistor enables horizontal binning.

Aspects of the above imaging system include wherein each pixel cell comprises: a plurality of photodiodes configured to generate image charge in response to the incident light; a source follower transistor coupled to a respective floating diffusion to generate the respective image signal in response to the image charge in the respective floating diffusion; and a first row select transistor coupled to the source follower transistor to output the respective image signal of the pixel cell.

Aspects of the above imaging system include wherein the first pixel cell is configured to output a first pixel signal to a first bitline, the second pixel cell is configured to output a second pixel signal to a second bitline, and the third pixel cell is configured to output a third pixel signal to a third bitline.

Aspects of the above imaging system include wherein the first pixel cell is configured to output a first pixel signal to a first bitline, the second pixel cell is configured to output a second pixel signal to the first bitline, and the third pixel cell is configured to output a third pixel signal to a second bitline.

Aspects of the above imaging system include wherein the first pixel cell is configured to output a first pixel signal to a first bitline, the second pixel cell is configured to output a second pixel signal to a second bitline, and the third pixel cell is configured to output a third pixel signal to the second bitline.

Aspects of the above imaging system include wherein the first pixel cell and the second pixel cell each output a respective pixel signal in response to a common selection signal.

Aspects of the above imaging system include wherein the first pixel cell and the third pixel cell each output a respective pixel signal in response to a common selection signal.

Embodiments of the present disclosure include an imaging system comprising: a pixel array comprising: a plurality of pixel cells arranged in rows and columns, wherein each pixel cell is configured to generate a respective image signal in response to incident light, wherein each pixel cell comprises a floating diffusion configured to receive image charge generated by one or more photodiodes of the respective pixel cell; a first transistor coupled to a floating diffusion of a first pixel cell of the plurality of pixel cells and a floating diffusion of a second pixel cell of the plurality of pixel cells, wherein the first pixel cell and the second pixel cell are in different rows of the pixel array; and a second transistor coupled to the floating diffusion of the first pixel cell and a floating diffusion of a third pixel cell of the plurality of pixel cells, wherein the first pixel cell and the third pixel cell are in different columns of the pixel array; and one or more lenses.

Aspects of the above imaging system also include wherein the first transistor enables vertical binning and the second transistor enables horizontal binning.

With regard to the processes, systems, methods, etc. described herein, it should be understood that, although the steps of such processes, etc. have been described as occurring according to a certain ordered sequence, such processes could be practiced with the described steps performed in an order other than the order described herein. It should further be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. The Abstract of the Disclosure is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An image sensor, comprising:
a sensor substrate; and
a pixel array disposed in the sensor substrate, the pixel array including:
a plurality of pixel cells arranged in rows and columns, wherein a first pixel cell of the plurality of pixel cells outputs a first pixel signal, a second pixel cell of the plurality of pixel cells outputs a second pixel signal, a third pixel cell of the plurality of pixels cells outputs a third pixel signal, the first and second pixel cells are in different rows of the pixel array, the first and third pixel cells are in different columns of the pixel array, and each pixel cell includes a floating diffusion, a plurality of photoelectric conversion devices, and a row select transistor;
a first transistor to enable vertical binning, the first transistor coupled to a floating diffusion of the first pixel cell and a floating diffusion of the second pixel cell; and
a second transistor to enable horizontal binning, the second transistor coupled to the floating diffusion of the first pixel cell and a floating diffusion of the third pixel cell.

2. The image sensor of claim 1, wherein each pixel cell further includes a source follower transistor coupled to the floating diffusion and the row select transistor.

3. The image sensor of claim 1, wherein the first pixel cell outputs the first pixel signal to a first bitline, the second pixel cell outputs the second pixel signal to a second bitline, and the third pixel cell outputs the third pixel signal to a third bitline.

4. The image sensor of claim 1, wherein the first pixel cell outputs the first pixel signal to a first bitline, the second pixel cell outputs the second pixel signal to the first bitline, and the third pixel cell outputs the third pixel signal to a second bitline.

5. The image sensor of claim 1, wherein the first pixel cell outputs the first pixel signal to a first bitline, the second pixel cell outputs the second pixel signal to a second bitline, and the third pixel cell outputs the third pixel signal to the second bitline.

6. The image sensor of claim 1, wherein the first pixel cell outputs the first pixel signal and the second pixel cell outputs the second pixel signal in response to a common selection signal.

7. The image sensor of claim 1, wherein the first pixel cell outputs the first pixel signal and the third pixel cell outputs the third pixel signal in response to a common selection signal.

8. An imaging system, comprising:
a substrate;
a pixel array disposed in the substrate, the pixel array including:
a plurality of pixel cells arranged in rows and columns, wherein a first pixel cell of the plurality of pixel cells outputs a first pixel signal, a second pixel cell of the plurality of pixel cells outputs a second pixel signal, a third pixel cell of the plurality of pixel cells outputs a third pixel signal, the first and second pixel cells are in different rows of the pixel array, the first and third pixel cells are in different columns of the pixel array, and each pixel cell includes a floating diffusion, a plurality of photoelectric conversion devices, and a row select transistor;

a first transistor to enable vertical binning, the first transistor coupled to a floating diffusion of the first pixel cell and a floating diffusion of the second pixel cell; and a second transistor to enable horizontal binning, the second transistor coupled to the floating diffusion of the first pixel cell and a floating diffusion of the third pixel cell; and readout circuitry coupled to the pixel array to readout image data from the pixel array.

9. The imaging system of claim 8, wherein each pixel cell further includes a source follower transistor coupled to the floating diffusion and the row select transistor.

10. The imaging system of claim 8, wherein the first pixel cell outputs the first pixel signal to a first bitline, the second pixel cell outputs the second pixel signal to a second bitline, and the third pixel cell outputs the third pixel signal to a third bitline.

11. The imaging system of claim 8, wherein the first pixel cell outputs the first pixel signal to a first bitline, the second pixel cell outputs the second pixel signal to the first bitline, and the third pixel cell outputs the third pixel signal to a second bitline.

12. The imaging system of claim 8, wherein the first pixel cell outputs the first pixel signal to a first bitline, the second pixel cell outputs the second pixel signal to a second bitline, and the third pixel cell outputs the third pixel signal to the second bitline.

13. The imaging system of claim 8, wherein the first pixel cell outputs the first pixel signal and the second pixel cell outputs the second pixel signal in response to a common selection signal.

14. The imaging system of claim 8, wherein the first pixel cell outputs the first pixel signal and the third pixel cell outputs the third pixel signal in response to a common selection signal.

15. An imaging system, comprising:
a sensor substrate;
a pixel array disposed in the sensor substrate, the pixel array including:

a plurality of pixel cells arranged in rows and columns, wherein a first pixel cell of the plurality of pixel cells outputs a first pixel signal, a second pixel cell of the plurality of pixel cells outputs a second pixel signal, a third pixel cell of the plurality of pixel cells outputs a third pixel signal, the first and second pixel cells are in different rows of the pixel array, the first and third pixel cells are in different columns of the pixel array, and each pixel cell includes a floating diffusion, a plurality of photoelectric conversion devices, and a row select transistor;

a first transistor to enable vertical binning, the first transistor coupled to a floating diffusion of the first pixel cell of the plurality of pixel cells and a floating diffusion of the second pixel cell of the plurality of pixel cells; and a second transistor to enable horizontal binning, the second transistor coupled to the floating diffusion of the first pixel cell and a floating diffusion of the third pixel cell of the plurality of pixel cells; and one or more lenses.

16. The imaging system of claim 15, wherein the first pixel cell outputs the first pixel signal to a first bitline, the second pixel cell outputs the second pixel signal to a second bitline, and the third pixel cell outputs the third pixel signal to a third bitline.

17. The imaging system of claim 15, wherein the first pixel cell outputs the first pixel signal to a first bitline, the second pixel cell outputs the second pixel signal to the first bitline, and the third pixel cell outputs the third pixel signal to a second bitline.

18. The imaging system of claim 15, wherein the first pixel cell outputs the first pixel signal to a first bitline, the second pixel cell outputs the second pixel signal to a second bitline, and the third pixel cell outputs the third pixel signal to the second bitline.

19. The imaging system of claim 15, wherein the first pixel cell outputs the first pixel signal and the second pixel cell outputs the second pixel signal in response to a common selection signal.

20. The imaging system of claim 15, wherein the first pixel cell outputs the first pixel signal and the third pixel cell outputs the third pixel signal in response to a common selection signal.

* * * * *